(12) United States Patent
Pohlad

(10) Patent No.: US 10,875,206 B2
(45) Date of Patent: Dec. 29, 2020

(54) REPOSITIONABLE ADHESIVE COATED SLIP SHEET

(71) Applicant: Michael Dwane Pohlad, Howard City, MI (US)

(72) Inventor: Michael Dwane Pohlad, Howard City, MI (US)

(*) Notice: Subject to any disclaimer, the term of this patent is extended or adjusted under 35 U.S.C. 154(b) by 0 days.

(21) Appl. No.: 16/240,419

(22) Filed: Jan. 4, 2019

(65) Prior Publication Data

US 2019/0210236 A1 Jul. 11, 2019

Related U.S. Application Data

(60) Provisional application No. 62/614,707, filed on Jan. 8, 2018.

(51) Int. Cl.
| | |
|---|---|
| *B26D 7/00* | (2006.01) |
| *C09J 7/00* | (2018.01) |
| *B26F 1/00* | (2006.01) |
| *B26D 7/01* | (2006.01) |
| *C09J 7/38* | (2018.01) |
| *C09J 7/20* | (2018.01) |
| *C09J 7/40* | (2018.01) |
| *B26F 1/38* | (2006.01) |
| *B26D 7/20* | (2006.01) |

(52) U.S. Cl.
CPC ............... *B26D 7/015* (2013.01); *B26D 7/20* (2013.01); *B26F 1/3813* (2013.01); *C09J 7/20* (2018.01); *C09J 7/38* (2018.01); *C09J 7/401* (2018.01); *C09J 2203/00* (2013.01); *C09J 2301/412* (2020.08); *C09J 2301/502* (2020.08)

(58) Field of Classification Search
None
See application file for complete search history.

(56) References Cited

U.S. PATENT DOCUMENTS

| | | | | |
|---|---|---|---|---|
| 3,719,113 | A * | 3/1973 | Gerber | B29C 71/02 83/56 |
| 6,649,011 | B1 * | 11/2003 | Hardt | A61K 9/7023 156/267 |
| 8,986,486 | B2 * | 3/2015 | Takamoto | H01L 21/6836 156/257 |

FOREIGN PATENT DOCUMENTS

WO WO-2016198810 A1 * 12/2016 ............... B26D 7/20

* cited by examiner

*Primary Examiner* — Linda L Gray
(74) *Attorney, Agent, or Firm* — Hultman Law, PLC; Eric Andrew Hultman, Esq.

(57) ABSTRACT

A method for creating and using a repositionable adhesive coated slip sheet is described herein. This repositionable adhesive coated slip sheet attaches to a worktable and temporarily anchors a substrate and its cutouts while the substrate is cut. The method principally comprises the steps of placing a layer of adhesive onto the top surface of a binding layer, placing the binding layer onto a worktable, placing a substrate onto the layer of adhesive, cutting the substrate with a blade, and then removing the cut substrate from the layer of adhesive, wherein the parts cut therefrom are prevented from moving, slipping, or falling off of the worktable during the cutting process. This allows the substrate and the cutouts cut therefrom to be removed from the worktable at the completion of the cutting process without damage to the worktable, cutter, or substrate.

21 Claims, 8 Drawing Sheets

REPOSITIONABLE ADHESIVE COATED SLIP SHEET

CROSS REFERENCE TO RELATED APPLICATION

This application is a non-provisional application claiming priority to an earlier filed U.S. provisional patent application entitled, "Repositionable Adhesive Coated Slip Sheet," filed Jan. 8, 2018, and assigned Ser. No. 62/614,707, the contents of which are incorporated herein by reference.

BACKGROUND OF THE INVENTION

Field of the Invention

The present invention generally relates to the field of paper products, more specifically, cut paper products, and particularly to an adhesive coated slip sheets for anchoring cut paper products.

Description of the Related Art

A significant problem with cutting substrates using a cutting devices or CNC type driven machines is substrate stability. When making cuts into a substrate material placed onto a worktable, the substrate may translate horizontally or vertically causing the cutting blade to deflect along the workpiece yielding cuts which are not perpendicular to the worktable. Further, substrate pivoting may occur yielding cuts which are not straight. This causes unnecessary scrap and waste as the cut substrate does not meet design intent.

Further, and particularly in designs with internal cuts, and particularly windows or openings made inside the borders of the substrate, a free-floating cutout may be created. This cutout is typically represented by some geometry such as but not limited to rectangles and circles, wherein the blade crosses or returns to a location on the substrate that was previously cut. This allows the cutout to become separated from the substrate, allowing it to move freely. Free roaming cutouts jam the machine, break blades, and can cause uneven cuts in the substrate. This is especially the case when a cutout lays on top of the substrate being cut, doubling the substrate's effective thickness presented to the blade.

One attempt to correct this issue on commercial machines is to provide a worktable with small holes in the face of the table. A vacuum is then applied to the underside of the worktable and through the holes in the face of the table providing a suction which holds the substrate in position during the cutting operation. These vacuum systems add expense, complexity, and machinery such as vacuum pumps which are not related to the core process of cutting substrates. Further, suction systems working with paper products will tend to accumulate debris in the worktable defeating the suction system. Moreover, the worktable's hole spacing presents a limitation on the size of cutouts which can be anchored via the system. If several holes are not located beneath each cutout, the cutouts may not be sufficiently anchored to the worktable. Several suction holes are needed under each cutout as a single opening under a cutout is not sufficient to prevent rotation. Therefore the hole spacing sets the minimum size of cutouts useable with the system.

Other attempts to address this issue utilize clamps which physically hold the substrate against the work table. Clamping the workpiece presents its own problems as the clamps must be positioned onto areas of the substrate which are not cut. These clamps create physical barriers between the cutter and the substrate preventing the cutter from traversing where a clamp is located. Moreover, this means that clamps are not suitable to retain cutouts in designs where clamps would cover any portion of the cut shape since it would block the cutter.

The invention described herein solves these disadvantages by providing a method for creating and using a repositionable adhesive coated slip sheet which attaches to a worktable and temporally anchors a substrate and its cutouts while the substrate is cut.

SUMMARY OF THE INVENTION

One method for cutting a substrate using a repositionable adhesive slip sheet is presented herein and comprises the steps of creating an adhesive slip sheet by placing a layer of adhesive onto the top surface of a binding layer. This adhesive slip sheet is then placed onto a worktable, wherein a substrate such as a mat board is then placed onto the layer of adhesive which holds it in position on the worktable. The substrate is then cut with a blade. Later, the cut substrate is then separated from adhesive slip sheet as the adhesive is non-permeant.

In another form of the invention, a second method for cutting a substrate using a repositionable adhesive slip sheet is presented herein. A paper backing is provided, which is then covered on one side with an adhesive layer making it sticky on one side. The sticky side is then covered with a removable release layer which prevents the sticky side from adhering to other objects while covered. Next, a binding layer having a top side and a bottom side is prepared. The top side of the binding layer is glued to the non-sticky (uncoated) side of the paper backing piece, wherein the glue is allowed to dry creating a repositionable adhesive slip sheet. This repositionable adhesive slip sheet is then placed onto a worktable, and once oriented on the worktable, the removable release layer is removed exposing the adhesive layer. Next, a substrate is placed onto the exposed adhesive layer of the repositionable adhesive slip sheet anchoring it place on the worktable. The substrate, such as a paper mat, is then cut with a blade. The substrate may be repositioned if necessary, since the adhesive is not permanent. Once all cuts have been made, the substrate is then separated from the repositionable adhesive slip sheet completing the process.

In yet another form of the invention, a third method for cutting a substrate using a repositionable adhesive slip sheet is presented herein. A paper backing is provided which is covered on one side using a layer of pressure sensitive microsphere adhesive making that side sticky. This layer of pressure sensitive microsphere adhesive is then covered with a removable silicone release layer which prevents the sticky side from adhering to other objects while covered. Next, the adhesive coated paper backing is cut into a first and a second piece. These first and second pieces of the adhesive coated paper backing are then glued to a fiber core binding layer of at least 40 mils thickness. The first piece of adhesive coated paper backing is glued onto the top side of the binding later, and the second piece onto the bottom side, both sides using a white glue. The pressure sensitive microsphere adhesive layer and the silicone release layer are oriented such that the adhesive sides are facing away from the fiber core binding layer. The glue is then allowed to dry, creating a repositionable adhesive slip sheet having an upper removable silicone release layer and a lower removable silicone release layer.

Next, the lower removable silicone release layer is removed from the repositionable adhesive slip sheet exposing the adhesive layer on its bottom side. The repositionable adhesive slip sheet is then placed onto a worktable, wherein the adhesive layer on its bottom side adheres to the worktable. Then, the upper removable silicone release layer is removed from the repositionable adhesive slip sheet exposing the adhesive layer on its top side, wherein a substrate to be cut, is then placed onto the exposed adhesive layer anchoring it in place. The substrate is then cut with a blade. The substrate may be repositioned if necessary, since the adhesive is not permanent. Once all cuts have been made, the substrate is then separated from the repositionable adhesive slip sheet completing the process.

BRIEF DESCRIPTION OF THE DRAWING FIGURES

Other advantages of the present invention will be readily understood by reference to the following detailed description in connection with the accompanying drawings wherein.

DESCRIPTION OF THE VARIOUS EMBODIMENTS

Figure 3:
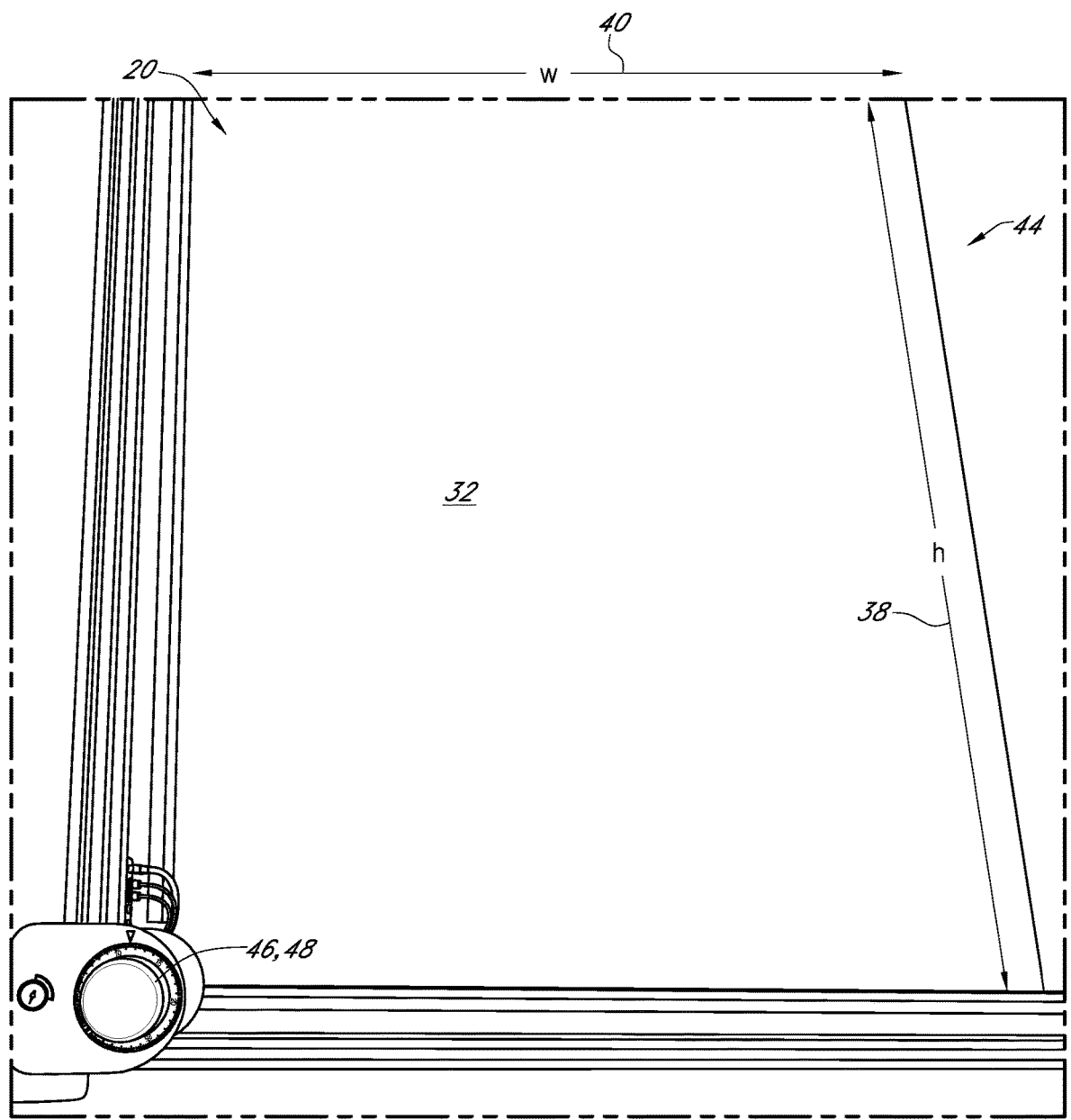
FIG. 3 is a perspective view of a CNC cutter, including a worktable, fitted with an adhesive coated slip sheet.

For purposes of the following description, the terms "upper," "lower," "left," "rear," "front," "vertical," "horizontal" and derivatives of such terms shall relate to the invention as oriented in FIG. 3. However, it is to be understood that the invention may assume various alternative orientations and configuration, except where expressly specified to the contrary. It is also to be understood that the processes illustrated in the attached drawings, and described in the following specification are simply exemplary embodiments of the inventive concepts described herein. Specific dimensions and other physical characteristics relating to the embodiments disclosed herein are not to be considered as limiting unless expressly stated in the claims, and only for such claims as the limitations are stated.

Construction of the Repositionable Adhesive Slip Sheet

In a first embodiment of the invention, a repositionable adhesive slip sheet 20 is constructed by joining a binding layer 22, to an adhesive layer 24. This may be done by placing an adhesive directly onto the binding layer 22, or by attaching an adhesive layer 24 containing a paper backing layer 26 to the binding layer 22 using an adhesive, such as white glue 28. In the preferred form, the adhesive layer 24 further includes a release layer 30 covering the entirety of the adhesive layer 24, thereby preventing objects from adhering to the adhesive layer 24 before it is ready for use in the method of use section below.

In one form of the invention, the binding layer 22 is a fiber core 23 material such as a roll of 40 mil, 1600 lbs., 15,400 Sq. Ft, 33 inches wide material from Carthage Paper Co. The adhesive layer, is then applied to either the top side 32 or the top and bottom sides 34 of the binding layer 22 either directly, or through a lamination process. The lamination process allows the adhesive to be pre-assembled to a paper backing 26, which is then glued to the binding layer 22 at a later step thereby joining the two layers together. A release layer 30 is preferably placed onto the adhesive layer(s) 24 such that the adhesive is fully covered.

The adhesive chosen should have a peel strength which will not damage the work piece when removed, but also have sufficiently lateral adhesion so as not to be easily translated when adhered to another surface. We have found that the preferred ranges for the adhesive layer 24 has a 180° peel strength of between 27 g (0.06 lb) and 91 g (0.20 lb) nominally, and 227 g (0.50 lb) maximally. Further the adhesive layer 24 is also preferred to have a loop strength in the preferred range of between 91 g (0.20 lb) and 136 g (0.30 lb) nominally, and 363 g (0.80 lb) maximally. For these two tests, a 0.5 mil (14 g/m2) dry film of microsphere adhesive was cast directly onto 1 mil thickness polyester film and tested against a #304 stainless steel block with a #3 surface finish. The 180° peel strength test used a 30-minute dwell time; and the loop test used a 1 square inch contact patch with a 1 second dwell time.

One preferred form of the adhesive layer 24 is Micronax™ 241-01 microsphere adhesive, which may be applied directly onto the binding layer 22 or may be provided separately for later assembly to the binding layer 22 via a lamination process. A second preferred form of the adhesive layer 24 is Micronax™ 243-01 microsphere adhesive. Both of these products are commercially available through Franklin Adhesives and Polymers, a division of Franklin International, located at 2020 Bruck St., Columbus, Ohio, 43207 USA. Data sheets for these two adhesives are provided with this application and are incorporated by reference.

When provided separately for the lamination process, the Micronax™ microsphere adhesive is preferably adhered to a 60 lb. weight of semi-gloss paper backing 26. This adhesive coated paper is then covered with a release layer 30. In one form of the invention, this release liner is 50 lb. weight silicone sheet. Further, the adhesive sheets may be pre-assembled in order to save time. Wherein in the pre-assembled instance, the adhesive layer 24 is added to a semi-gloss paper backing 26 and covered with the silicone release layer 30 offsite. This combination may be ordered through Wausau Coated Products and is preferably sized as follows—a 6.4 mil, 560 lb., 16,000 sq. ft. sheet which is 33 inches wide.

Using the specified Wausau pre-assembled product with a paper backing 26, the adhesive liner 24 is then laminated to a binding layer 22 using a compatible glue to combine and attach the paper backing 26 to the binding layer 22. One preferred glue for this lamination process is an adhesive 28 such as white glue provided by National. This adhesive is preferably placed onto the surface of the binding layer at a 1 mil thickness. This binds the paper backing of the adhesive layer to the binding layer, leaving the release layer 30 intact so that it may later be removed exposing the adhesive. This laminated product provides the rigidity offered by the binding layer to the adhesive sheet.

In a further form of the invention, the binding layer 22 may further include an additional cover layer 36 on its bottom side 34. This cover layer 36 acts as a covering for the bottom of the binding layer 22, which would otherwise be an exposed fiber core 23 in the form of the invention detailed above. One preferred form of the cover layer 36 is a roll of white spectrum offset paper, 6 mils thick, 600 lbs., 16,000 sq. ft. and 33 inches wide. This can be procured from Georgia Pacific. This layer, if included, is preferably laminated to the binding layer 22 with a suitable adhesive 28, such as the white glue mentioned earlier and provided by National, preferably also at a 1 mil thickness.

Once assembled, the laminated material may be cut to a desired height 38, and width 40. If the preferred forms of the products described above are used, the repositionable adhesive slip sheet 20 will be 33 inches high. It may then be cut to any width 40, but a preferred width is 41 inches, yielding a repositionable adhesive slip sheet 20 with dimensions of 33 inches high by 41 inches wide. This size was chosen as a preferred size as it is slightly larger than the standard paper size of 32"×40", which allows a workpiece to be placed easily upon the repositionable adhesive slip sheet 20, while minimizing waste. The estimated yield using the preferred materials above, is about 1,500 sheets of repositionable adhesive slip sheet 20 sized at 33"×41" per master roll of the materials stated.

Method of Use for the Repositionable Adhesive Slip Sheet

Figure 1:
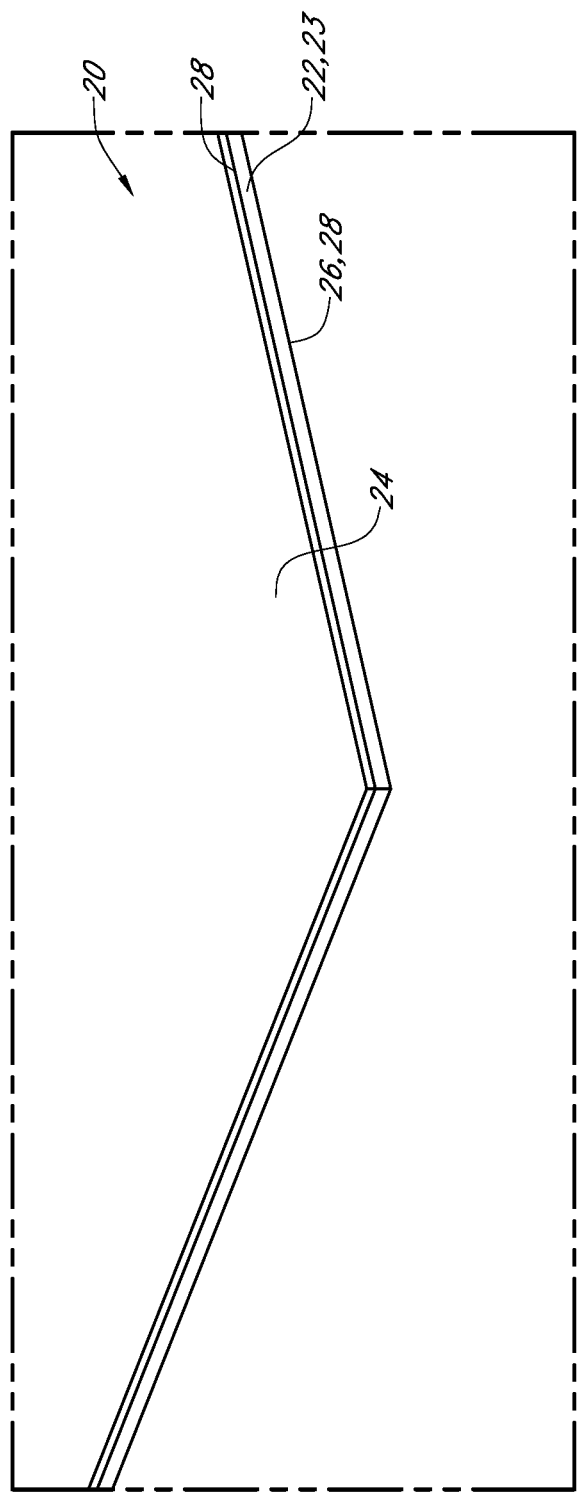
FIG. 1 is a perspective view of an adhesive coated slip sheet.
Figure 2:
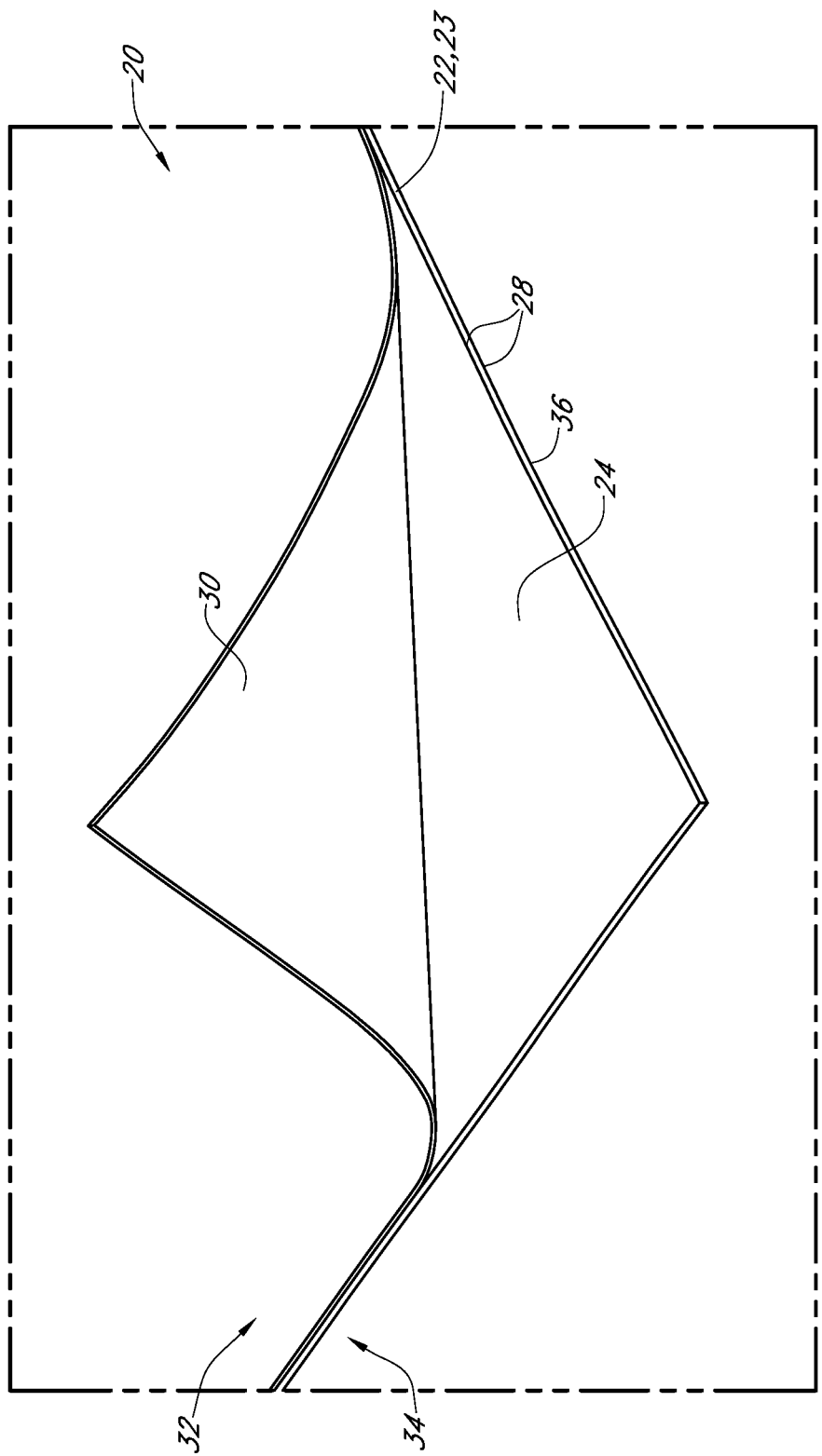
FIG. 2 is a perspective view of an adhesive coated slip sheet with the release liner partially peeled off.
Figure 4:
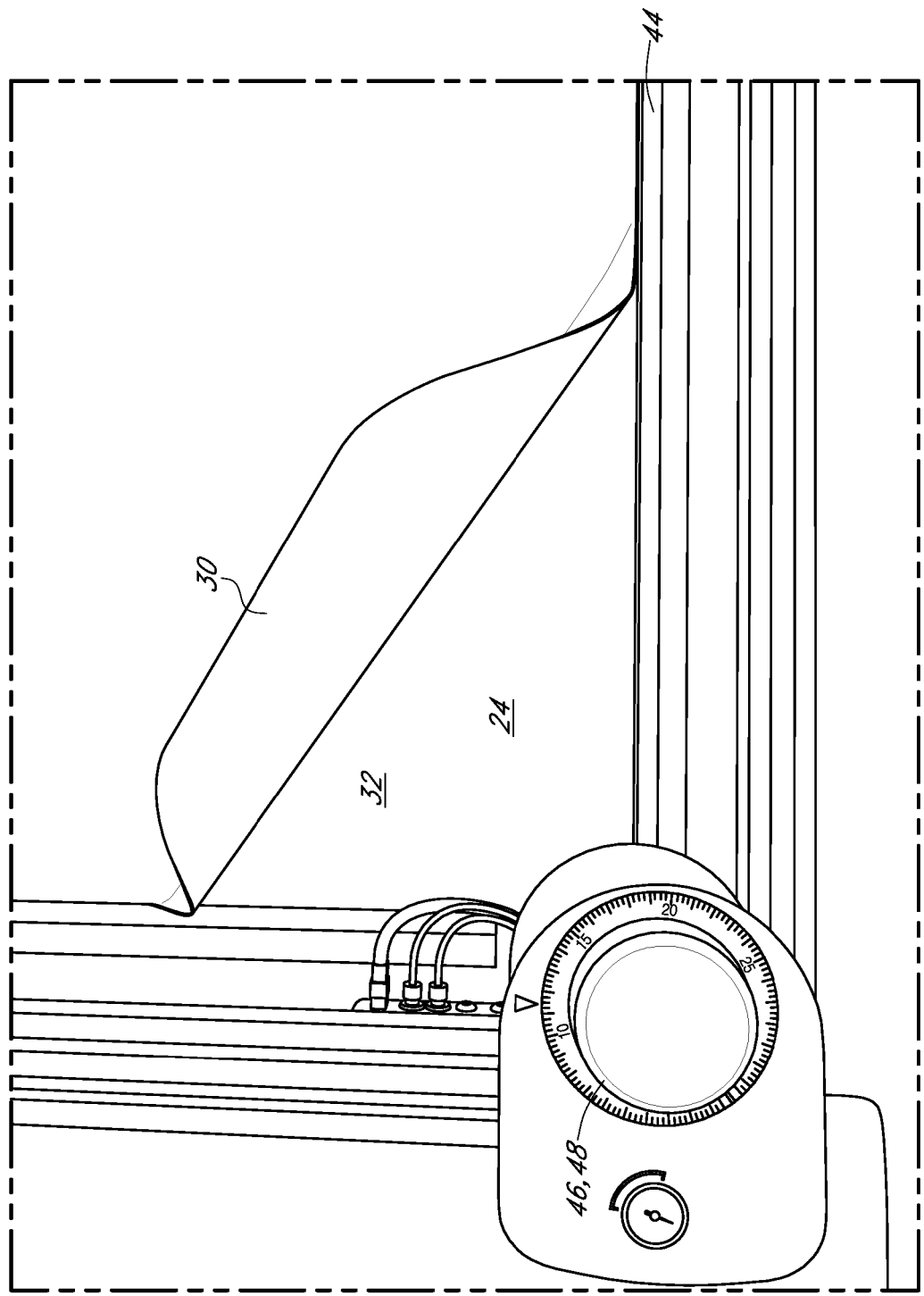
FIG. 4 is a perspective view of a CNC cutter, including a workspace, fitted with an adhesive coated slip sheet with the release liner partially removed exposing the adhesive layer.

The intended use of the repositionable adhesive slip sheet 20 is to anchor a substrate 42 such as a photo mat, paper, paperboard, cardboard, foam, thin metal sheet, vinyl sheet, or similar style products to a worktable 44 wherein a blade 48, such as a knife or saw is used to cut the substrate 42. In the form of the invention shown in FIG. 1, the repositionable adhesive slip sheet 20 includes a binding layer 22, a cover layer 36, an adhesive layer 24, and a release layer 30 located on its top side 32. As shown in FIG. 2, the release layer 24 is removable from the repositionable adhesive slip sheet 20, and once removed, exposes the adhesive layer 24. In FIG. 3, the repositionable adhesive slip sheet 20 is placed onto a worktable 44. FIG. 3 further depicts a cutter head 46 containing a blade 48, which is CNC controlled, preferably by a computer. FIG. 4, depicts another view of the repositionable adhesive slip sheet 20, wherein the release layer 30 is being removed after being mounted to the worktable 44. If the repositionable adhesive slip sheet 20 includes an adhesive layer 24 on both the top 32 and bottom 34 surfaces, the bottom layer would be removed as shown in FIG. 2, exposing the bottom side 34 adhesive and allowing the repositionable adhesive slip sheet 20 to be adhered to the worktable 44. After the repositionable adhesive slip sheet 20 is placed onto the worktable 44, the top 32 release layer 30 may then be removed as shown in FIG. 4, preparing the repositionable adhesive slip sheet 20 for the placement of a substrate 42 onto its adhesive surface.

Figure 5:
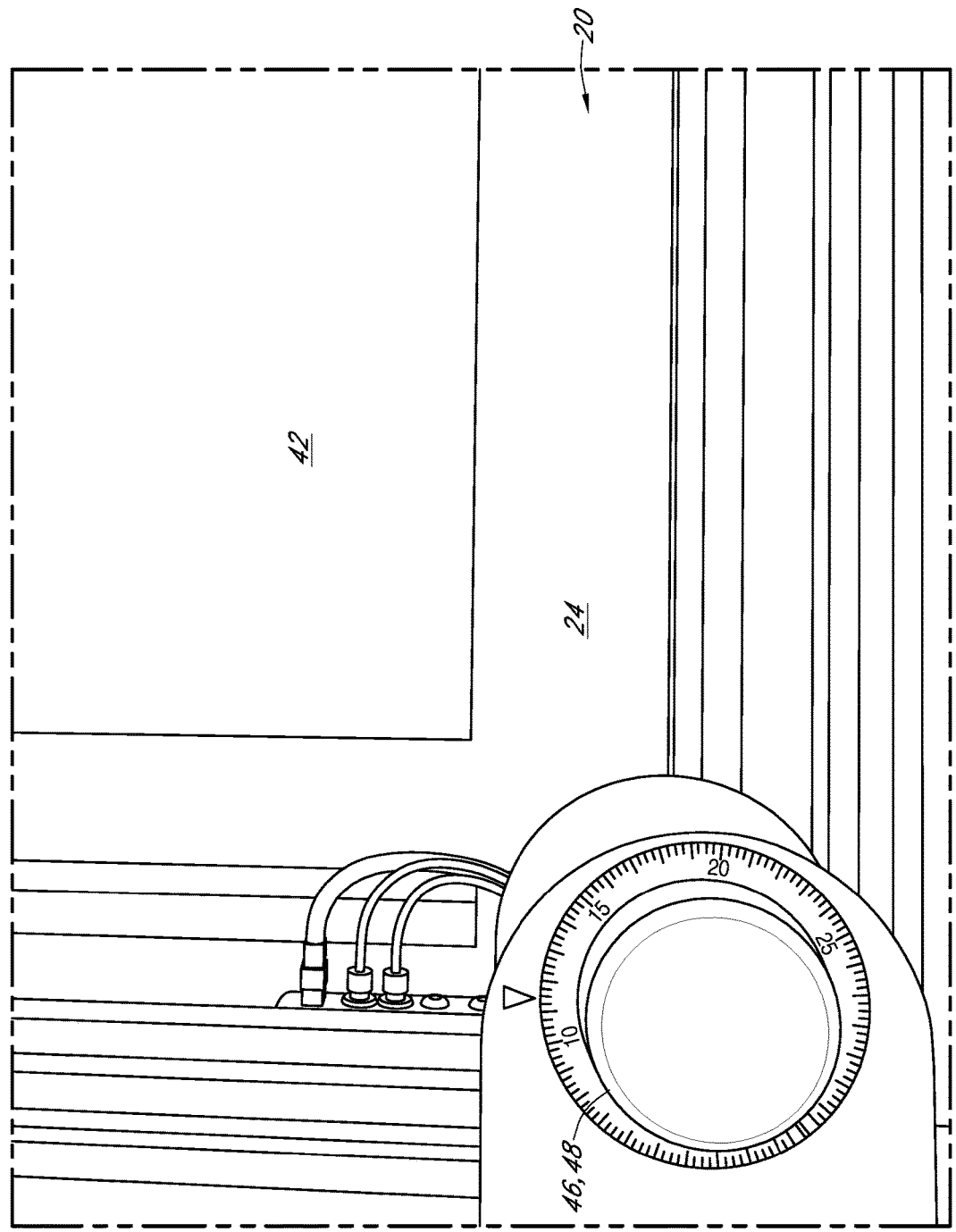
FIG. 5 is a top view of a CNC cutter, including a workspace, fitted with an adhesive coated slip sheet and a substrate (workpiece) adhered to its surface.
Figure 6:
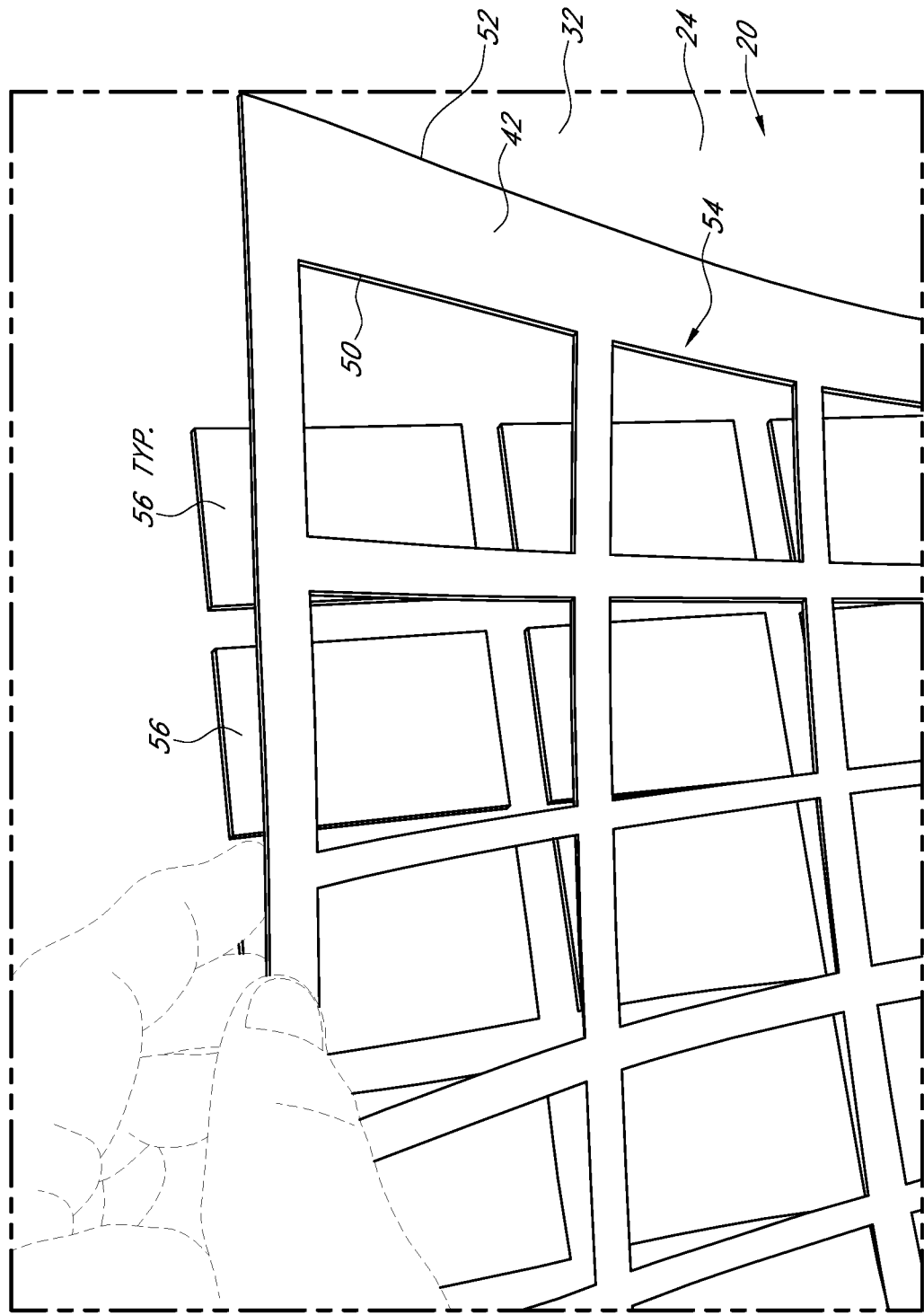
FIG. 6 is a perspective view of a cut substrate (workpiece) being removed from the adhesive coated slip sheet, wherein the cutout portions of the substrate are retained on the adhesive coated slip sheet.
Figure 7:
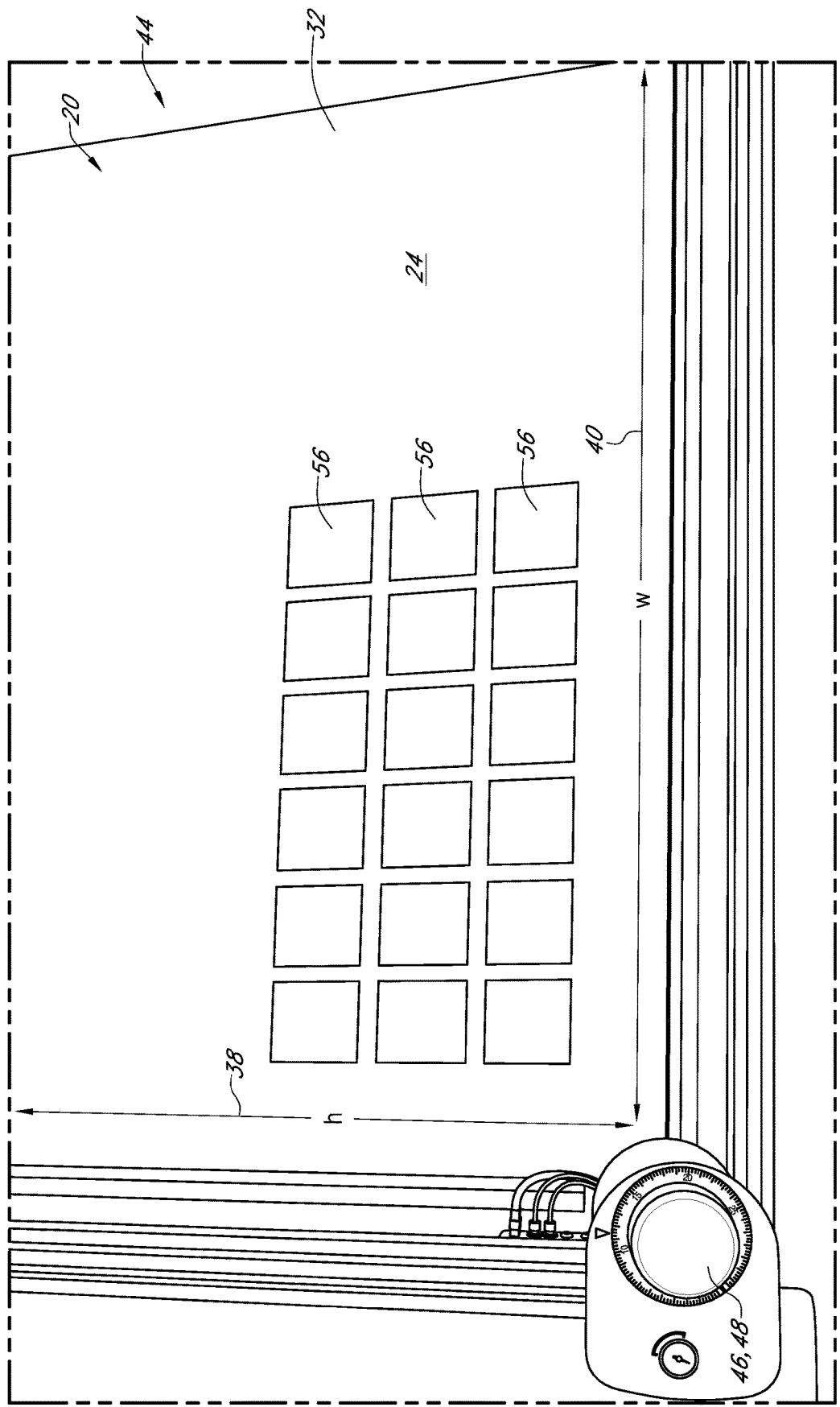
FIG. 7 is a perspective view of the cutout portions of a substrate remaining on the adhesive coated slip sheet after the substrate (workpiece) is removed.
Figure 8:
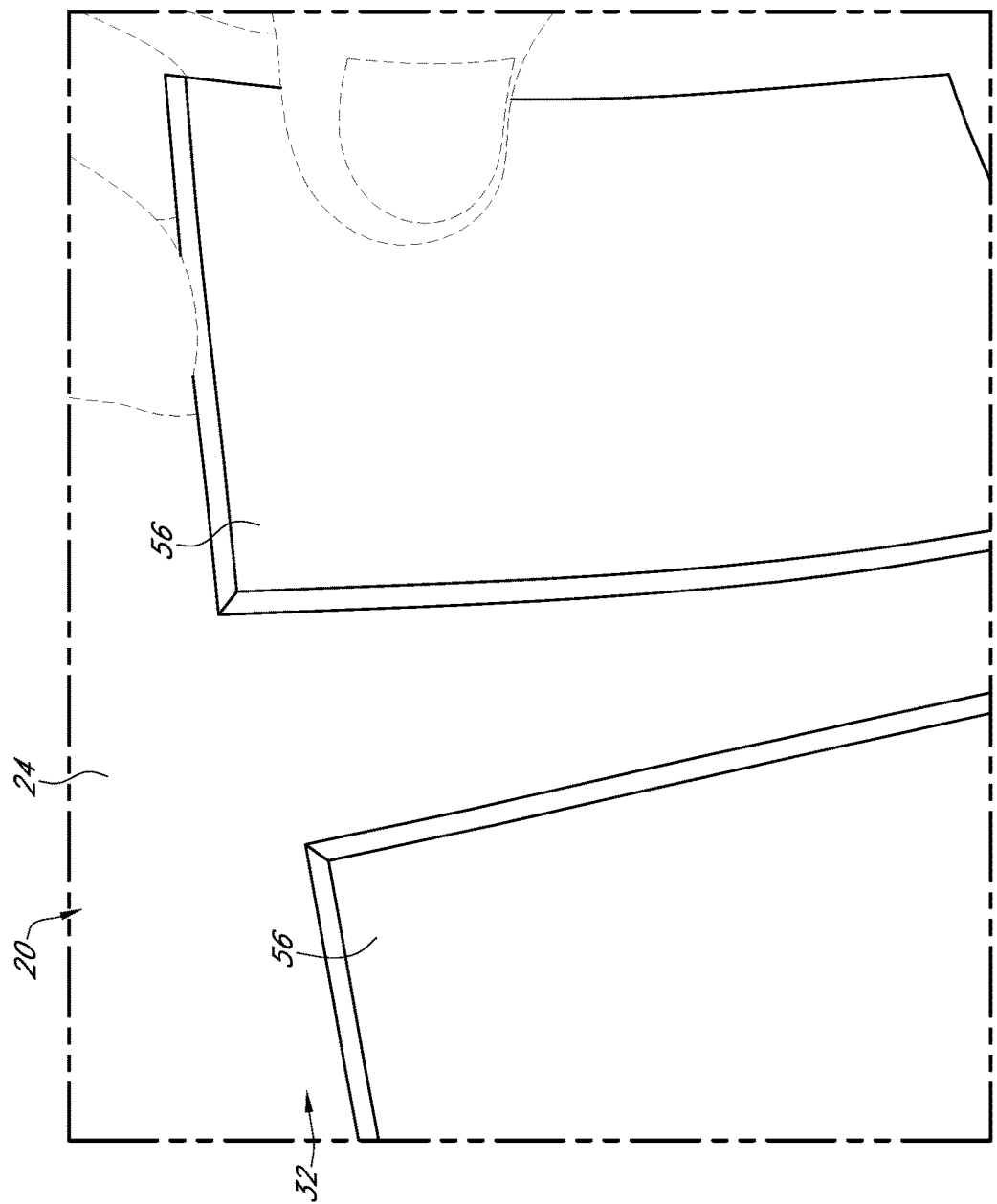
FIG. 8 is a perspective view of a cutout portion being removed from the adhesive coated slip sheet after the substrate (workpiece) was removed.

FIG. 5, depicts the repositionable adhesive slip sheet 20 with an exposed adhesive layer 24. A substrate 42 is also shown mounted to the repositionable adhesive slip sheet 20, by placing the substrate 42 on top 32 of the repositionable adhesive slip sheet 20, and pressing the substrate 42 downward onto the exposed adhesive layer 24 holding the substrate in position. The substrate 42 is then cut 50 with a blade 48, which will either partition the substrate 52, or create cutout features 54. Whenever a cut is completed by returning the blade to the start of a cutout feature 54, this creates a loose cutout 56 piece (also called a dropout). This cutout 56 is retained in its current position on the worktable 44 by the repositionable adhesive slip sheet 20, and particularly the adhesive layer 24. FIG. 6 shows the substrate 42 being removed from the repositionable adhesive slip sheet 20, without tearing or destruction of the substrate 42. Further, FIG. 6 shows that the cutouts 56 are retained in position on the adhesive layer 24 of the repositionable adhesive slip sheet 20 after the substrate is removed. Once the substrate 42 is removed, the cutouts 56 may then be removed (See FIG. 8) from the adhesive layer 24 of the repositionable adhesive slip sheet 20, by peeling them off of the sheet. This prepares the worktable 44 for additional sheets of substrate 42 which may then be placed onto the repositionable adhesive slip sheet 20, allowing for multiple uses before the repositionable adhesive slip sheet 20 is itself removed from the worktable 44 and disposed of. Once the repositionable adhesive slip sheet 20 is either contaminated through the adherence of foreign objects, or through loss of its adhesive properties, it may be replaced by a new repositionable adhesive slip sheet 20, and the process continued until all substrate 42 cutting needs are completed.

The novel repositionable adhesive slip sheet 20 allows for any number cutouts to be made in a substrate 42, wherein a traditional table, even a vacuum table, would fail to anchor the parts. In product trials, as many as 50 small openings were cut into a substrate 42 without any drops falling behind or pulling away from the substrate, thereby preventing the CNC cutter from snagging, ripping or twisting the substrate. Further, the novel repositionable adhesive slip sheet 20, has been tested with substrates 42 comprised of various papers, vinyl, and even thin metal sheets. This task would not be possible without using the new repositionable adhesive slip sheet 20.

As an added benefit, the substrate may be cut to a depth deeper than the thickness of the substrate itself. This would not be possible without using a repositionable adhesive slip sheet 20, as the table itself would be damaged by the cutting blade 48. While deep cuts may damage the repositionable adhesive slip sheet 20 if made of fiber core, it protects the worktable 44 and allows for cutout features 54, and cutouts 56 with clean borders. However, in an alternate form of the invention presented for through cutting—substitute materials may be utilized for the binding layer 22 allowing the slip sheet 20 to self-heal cuts in its surface. Alternate materials for the binding layer 22 include self-healing polymer plastics such as polyethylene as well as other materials having similar self-healing properties that are capable of receiving an adhesive layer 24.

The above description is considered that of the preferred embodiments only. Modifications to the invention will occur to those skilled in the art and those who make use of the invention. Therefore, it is understood that the embodiments shown in the drawings and the examples set forth herein are described merely for illustrative purposes, and are not intended to limit the scope of the invention as interpreted according to the principles of patent law, including the doctrine of equivalents.

The invention claimed is:

1. A method for cutting a substrate using an adhesive slip sheet comprising the steps of:
    placing a layer of adhesive onto a top surface of a binding layer wherein the layer of adhesive has a loop strength of less than 363 g (0.80 lb);
    placing the binding layer onto a worktable;
    placing a substrate onto the layer of adhesive;
    cutting the substrate with a blade; and
    removing the substrate from the layer of adhesive.

2. The method as defined in claim 1, wherein the layer of adhesive has a loop strength of between 91 g (0.20 lb) and 136 g (0.30 lb).

3. A method for cutting a substrate using an adhesive slip sheet comprising the steps of:
   placing a layer of adhesive onto a top surface of a binding layer
   having a fiber core;
   placing the binding layer onto a worktable;
   placing a substrate onto the layer of adhesive;
   cutting the substrate with a blade; and
   removing the substrate from the layer of adhesive.

4. The method as defined in claim 3, wherein the fiber core is at least 40 mils thick.

5. A method for cutting a substrate using an adhesive slip sheet comprising the steps of:
   placing a layer of adhesive onto a top surface of a binding layer;
   placing a layer of adhesive onto a bottom surface of the binding layer;
   placing the binding layer onto a worktable;
   placing a substrate onto the layer of adhesive;
   cutting the substrate with a blade; and
   removing the substrate from the layer of adhesive.

6. The method as defined in claim 5, further comprising the step of:
   adhering the binding layer to the worktable.

7. The method as defined in claim 1, further comprising the step of providing a cover layer glued to a bottom side of the binding layer.

8. The method as defined in claim 1, wherein the step of removing the substrate from the layer of adhesive, further comprises the step of replacing the substrate with an uncut substrate; and repeating the step of cutting with the uncut substrate.

9. The method as defined in claim 1, further comprising the steps of: covering the layer of adhesive with a removable release layer; and
   removing the removable release layer prior to the step of placing the substrate onto the layer of adhesive.

10. The method as defined in claim 1, wherein the step of cutting the substrate with a blade further includes the step of: cutting through the substrate and into the top surface of the binding layer.

11. A method for cutting a substrate using a repositionable adhesive slip sheet comprising the steps of:
    providing a paper backing;
    covering one side of the paper backing with an adhesive layer, leaving a non-coated side;
    covering the adhesive layer with a removable release layer;
    providing a binding layer further having a top side and a bottom side;
    gluing the non-coated side of the paper backing to the top side of the binding layer;
    allowing the glue to dry, creating a repositionable adhesive slip sheet;
    placing the repositionable adhesive slip sheet onto a worktable;
    removing the removable release layer from the repositionable adhesive slip sheet;
    placing a substrate onto the adhesive layer on a top side of the repositionable adhesive slip sheet;
    cutting the substrate with a blade; and
    removing the substrate from the repositionable adhesive slip sheet.

12. The method as defined in claim 11, wherein the step of removing the substrate from the repositionable adhesive slip sheet, further comprises the steps of: replacing the substrate with an uncut substrate; and repeating the step of cutting with the uncut substrate.

13. The method as defined in claim 11 further comprising the steps of;
    creating a cutout feature by cutting the substrate with a blade;
    completing the cutout feature creating a cutout separated from the substrate; and
    removing the cutout from the repositionable adhesive slip sheet.

14. The method as defined in claim 11, further comprising the steps of providing a cover layer comprised of offset paper with a minimum thickness of 6 mils; and gluing said cover layer to the bottom side of the binding layer.

15. The method as defined in claim 11, wherein the removable release layer is further comprised of silicone.

16. The method as defined in claim 11, wherein the step of gluing the non-coated side of the paper backing to the top side of the binding layer is completed using white glue.

17. The method as defined in claim 11, wherein the step of cutting the substrate with a blade further includes the step of: cutting through the substrate and into the top side of the repositionable adhesive slip sheet.

18. A method for cutting a substrate using a repositionable adhesive slip sheet comprising the steps of:
    providing a paper backing;
    covering one side of the paper backing with a microsphere adhesive layer having a loop strength of less than 363 g (0.80 lb), thereby creating a paper backing with microsphere adhesive having an adhesive side and a non-adhesive side;
    covering the adhesive side with a removable silicone release layer;
    separating the paper backing with microsphere adhesive into at first piece and a second piece;
    providing a fiber core binding layer of at least 40 mils thickness, further having a top side and bottom side;
    gluing the non-adhesive side of the first piece to the top side of the fiber core binding layer with a white glue;
    gluing the non-adhesive side of the second piece to the bottom side of the fiber core binding layer with a white glue;
    allowing the glue to dry, creating a repositionable adhesive slip sheet having an upper removable silicone release layer and a lower removable silicone release layer;
    removing the lower removable silicone release layer from the repositionable adhesive slip sheet;
    placing the repositionable adhesive slip sheet onto a worktable wherein the microsphere adhesive layer on its bottom side adheres to the worktable;
    removing the upper removable silicone release layer from the repositionable adhesive slip sheet;
    placing a substrate onto the microsphere adhesive layer on a top side of the repositionable adhesive slip sheet;
    cutting the substrate with a blade; and
    removing the substrate from the repositionable adhesive slip sheet.

19. The method as defined in claim 18, wherein the step of removing the substrate from the repositionable adhesive slip sheet, further comprises the step of replacing the substrate with an uncut substrate; and repeating the step of cutting with the uncut substrate.

20. The method as defined in claim 18, further comprising the steps of;
   creating a cutout feature by cutting the substrate with a blade;
   completing the cutout feature creating a cutout separated from the substrate; and
   removing the cutout from the repositionable adhesive slip sheet.

21. The method as defined in claim 18, wherein the step of cutting the substrate with a blade further includes the step of cutting through the the substrate and into the top side of the repositionable adhesive slip sheet.

* * * * *